Sept. 8, 1964  M. RITUMS  3,147,987
ADJUSTABLE WHEEL SUPPORT FOR A LAWN MOWER
Filed Aug. 22, 1962  2 Sheets-Sheet 1
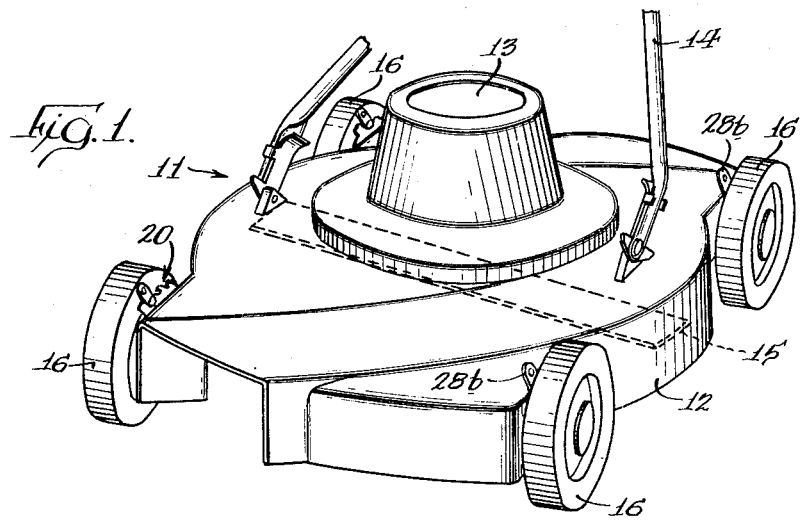
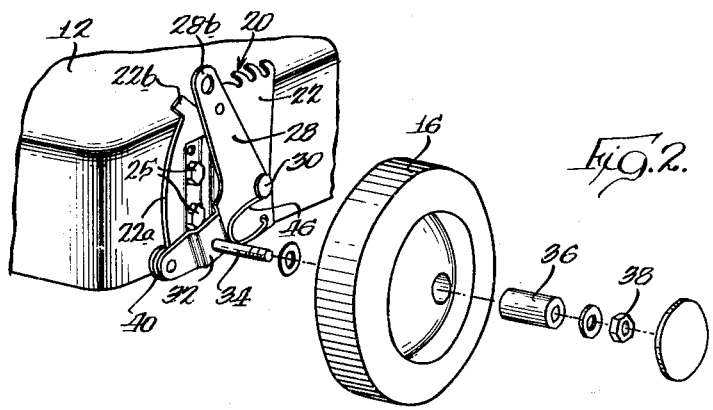
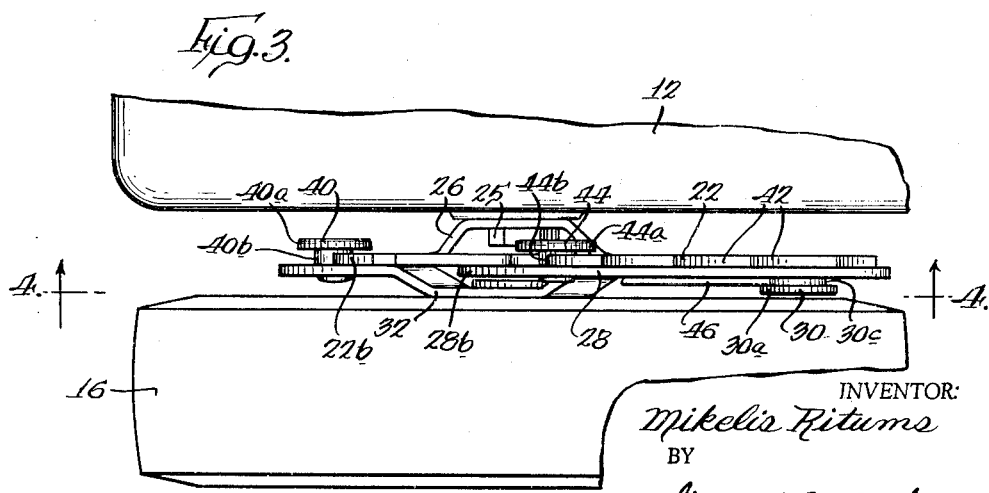
INVENTOR:
Mikelis Ritums
BY
George R. Clark
Atty.

Sept. 8, 1964 M. RITUMS 3,147,987
ADJUSTABLE WHEEL SUPPORT FOR A LAWN MOWER
Filed Aug. 22, 1962 2 Sheets-Sheet 2
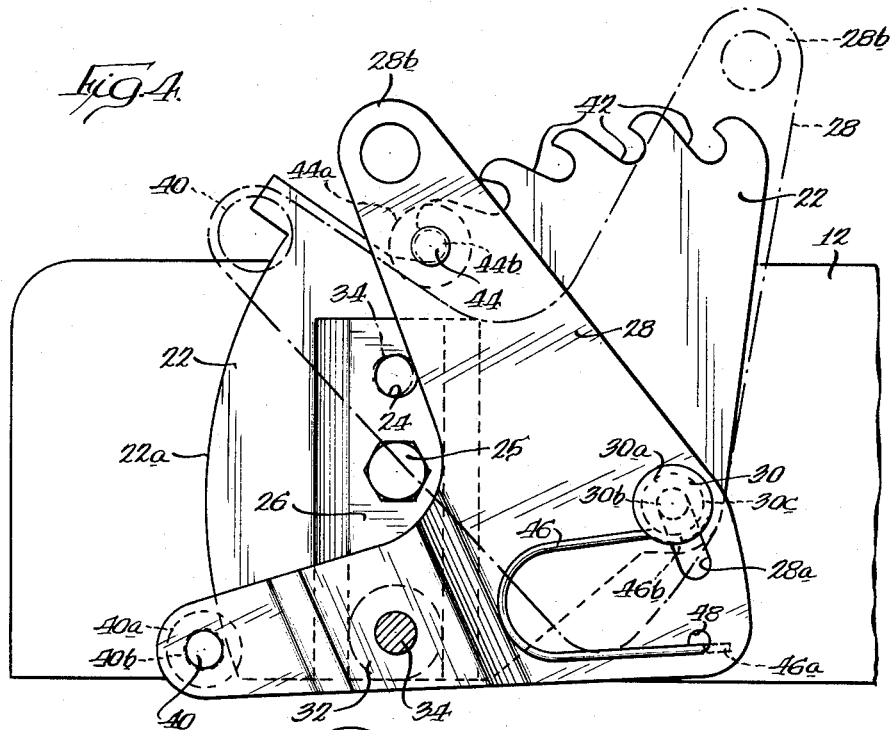
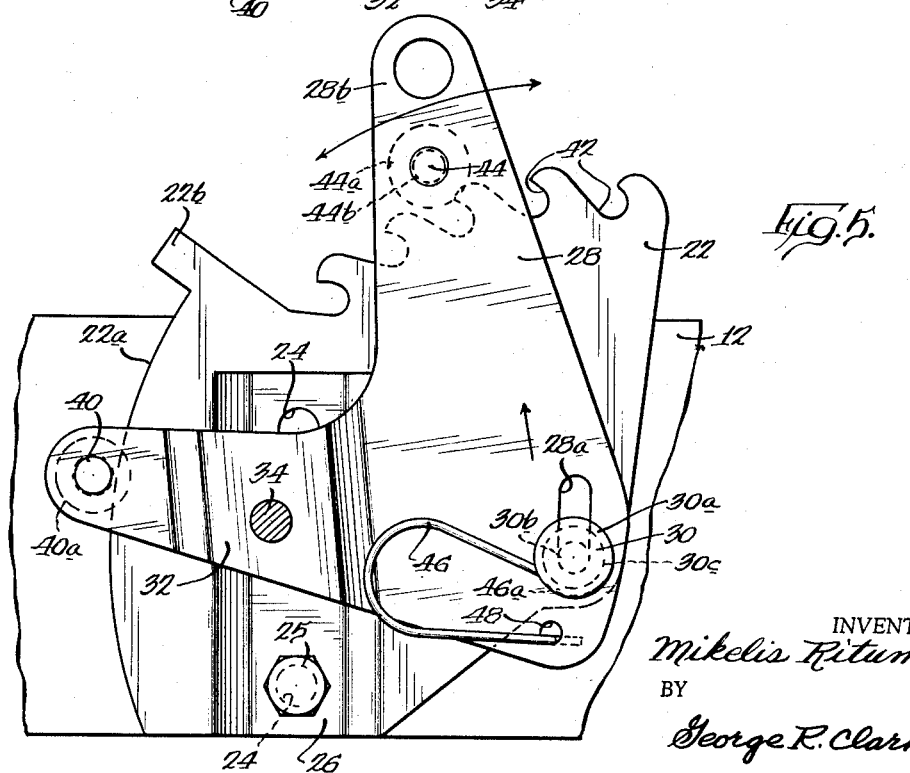
INVENTOR:
Mikelis Ritums
BY
George R. Clark
Atty United States Patent Office 3,147,987
Patented Sept. 8, 1964

3,147,987
ADJUSTABLE WHEEL SUPPORT FOR
A LAWN MOWER
Mikelis Ritums, Oak Lawn, Ill., assignor to Sunbeam
Corporation, Chicago, Ill., a corporation of Illinois
Filed Aug. 22, 1962, Ser. No. 218,638
6 Claims. (Cl. 280—43.17)

This invention relates to adjustable wheel supporting means and more particularly to means for adjustably supporting the wheels of a lawn mower to vary the height of cut.

The well known rotary lawn mower which is in widespread use today utilizes a horizontally disposed blade which is rotated about a vertical axis. To change the height to which the grass is cut with such a mower, it is common practice to vary the height at which the rotary blade is supported above the ground. This variation is accomplished either by moving the height of the blade with respect to the housing or by moving the supporting wheels vertically with respect to the housing. The instant invention deals with a simple means for movably supporting or mounting the wheels with respect to the mower housing.

In asmuch as many mowers are already in use without any sort of easily operated height adjustment means, it would be desirable to provide a height adjustment which could be used as an attachment for lawn mowers which were marketed without this feature. Many of these lawn mowers now in use simply utilize a wheel axle which is movable between a number of vertically spaced holes to accomplish the height of cut adjustment. It would be desirable to have an attachment which could be used with these lawn mowers to simplify the task of moving the wheels vertically to accomplish the height of cut adjustment.

It is, therefore, an object of the present invention to provide a new and improved height of cut adjutment means for a rotary lawn mower.

It is a further object of the present invention to provide an adjustable wheel supporting or mounting means for a lawn mower which may be used as an attachment for lawn mowers already on the market or in use.

It is an additional object of the present invention to provide a wheel adjustment means for lawn mowers which may be easily operated from above to lock the wheels in any one of a number of vertical positions.

Yet another object of the invention is to provide an attachment for mounting wheels for vertical movement, said attachment having a minimum number of parts and being easy to install and to operate.

Other objects of the invention will become apparent from the following detailed description of an adjustable wheel mounting means forming a specific embodiment of the invention, when read in conjunction with the appended drawings in which:

FIG. 1 is a perspective view of a rotary mower to which one embodiment of the invention has been applied;

FIG. 2 is an enlarged, exploded perspective view of an adjustable wheel mounting means forming one embodiment of the invention;

FIG. 3 is a top plan view of the wheel mounting means shown in FIGS. 1 and 2;

FIG. 4 is a vertical section taken along line 4—4 of FIG. 3; and

FIG. 5 is a vertical section similar to FIG. 4 with the adjustable wheel mounting member shown in the unlatched position.

The invention provides an adjustable wheel mounting attachment which may be readily secured to a lawn mower housing and which permits easy vertical adjustment of the wheels mounted thereon to change the height of cut of a rotary lawn mower. The attachment itself consists of two plates which are connected together for relative pivotal and sliding movement. The pivotal movement changes the vertical height of the wheel supporting axle and the sliding movement engages and disengages a latching means which locks the plates in a selected relative position.

Referring more specifically to the drawings, there is shown in FIG. 1 a rotary lawn mower generally designated by the reference numeral 11 comprising an inverted cup-shaped housing 12, a motor or engine 13 and a handle 14. The motor 13 is provided with a vertical drive shaft which extends downwardly into the housing 12 and which supports at its lower end a horizontal blade 15 which is shown in dotted lines in FIG. 1. The housing 12 is supported for movement across a lawn by four wheels 16.

To vary the height of cut of such a lawn mower, it is necessary to change the height above the ground at which the blade 15 is supported. This change in blade height is most easily accomplished by changing the vertical location or position of the supporting wheels 16 on the housing 12. Many mowers currently in use are provided with a series of vertically spaced holes which are adapted to receive the wheel supporting axles at various vertical heights. My invention comprises an attachment 20 which may be applied to these existing lawn mowers and which will permit the easy adjustment of the wheel height without requiring the disassembly of the wheel supporting axle.

The attachment 20 includes a side plate 22 which is adapted to be readily assembled to the side of a lawn mower housing. To accomplish this mounting, the side plate 22 is formed with a series of vertically spaced holes 24 which are spaced to be aligned with the axle mounting holes found in most lawn mower housings and bolts 25 are utilized to secure the side plate 22 to the housing 12. The portion of the side plate 22 adjacent the mounting holes 24 is provided with an offset portion 26 by means of which the attachment 20 is spaced outwardly from the lawn mower housing 12 as may best be seen in FIG. 3.

To provide adjustable support of each wheel 16 with respect to the housing 12, a support member or lever 28 is pivotally connected to the side plate 22 by means of a pin 30 which has an enlarged head portion 30a and a shank 30b of reduced diameter. The shank 30b is received in a slot 28a formed in the lever 28. It can, therefore, be seen that the pin 30 and the slot 28a permit the lever 28 to be rotated and slide sideways a limited amount.

At the lower edge of the lever 28 there is an outwardly offset portion 32 on which is supported an outwardly extending axle 34. As may best be seen in FIG. 2, the axle 34 is adapted to receive a wheel bearing sleeve 36 which rotatably supports the wheel 16. A nut 38 is threadedly received on the end of the axle 34 to retain the sleeve 36 and the wheel 16 assembled to the wheel supporting attachment 20.

As the lever 28 is rotated about the pin 30, the axle 34 and the wheel 16 supported thereon are moved vertically along a curved path having the pin 30 as the center of curvature. To guide the lever 28 in its rotating and sliding movement with respect to the side plate 22, a guide member 40 is mounted on the inside face of the lever 28. As may best be seen in FIG. 3, the member 40 includes an enlarged head portion 40a and a shank 40b of reduced diameter. The side plate 22 is formed with a curved edge surface 22a which cooperates with the guide member 40 permitting the lever 28 to pivot about the pin 30 while the enlarged head 40a extends over the edge of the side plate 22 and aids in the support of the lever 28 for rotating and sliding movement with respect to the side plate 22. At the upper end of the curved surface 22a, there is provided a projection 22b which acts as a stop engaging the pin 30 to limit the amount of rotation of the lever 28.

To lock the lever 28 in various rotary positions with respect to the side plate 22 and thereby obtain various vertical positions of the axle 34 and the wheel 16, there are provided a series of latch slots 42 on the side plate 22 and a latch pin 44 on the lever 28. The latch pin 44 is similar to the pivot pin 30 in that it is formed with a head portion 44a and a shank 44b. The shank portion 44b is receivable within any of the slots 42 while the enlarged head 44a engages the side of the plate 22 remote from the lever 28 so as to aid in the support of the lever 28. The inner ends or bottoms of all of the latch slots 42 are located the same radial distance from the pivot pin 30. In addition, the latch pin 44 is spaced from the upper end of the slot 28a a distance equal to the pin to slot distance. As a consequence, the pin 30 is always positioned at the upper end of the slot 28a when the latch pin 44 is seated in one of the latch slots 42. When the latch pin 44 is so located in one of the latch slots 42, relative rotation between the lever 28 and the side plate 22 is prevented. The slots 42 are spaced so as to obtain a variation in the vertical height of axle 34 of about one-half inch between each adjacent position in which lever 28 may be latched.

It should be noted that the slots 42 extend at an angle to a radial line from the pivot pin 30 to the base of each slot. The reason for this angled relation of the slots is so that the force exerted by the latch pin 44 will be against the side of the slot and there will be no tendency for the lever 28 to become unlatched during use of the lawn mower. To retain the latch pin 44 in the latched position, there is provided a U-shaped spring 46 which has an offset end 46a extending through an opening 48 in the lever 28. The other end of the U-shaped spring 46 is formed with a curved portion 46b which is received in an undercut shoulder 30c in the head portion of the pivot pin 30. The spring 46 urges the lever 28 downwardly with respect to the pivot pin 30 and consequently urges the pin 30 toward the upper end of the slot 28a. Thus in the position shown in FIG. 4 with the pin 30 at the upper end of the slot 28a, the latch pin 44 is seated in one of the slots 42.

When the spring 46 is compressed and the lever 28 urged upwardly with respect to the side plate 22, the latch pin 44 is moved out of the slot 42 permitting free rotation of the lever 28 with respect to the side plate 22. The upper end of the lever 28 is provided with a manual operating handle or portion 28b. When the handle 28b is lifted upwardly, the latch pin 44 becomes disengaged from one of the slots 42 so that the lever 28 may be rotated to obtain the desired vertical position of the axle 34. In FIG. 4 the lever 28 is shown in solid lines in its minimum axial height position which gives maximum lawn mower height of cut. The dotted line position of lever 28 as shown in FIG. 4 represents the maximum axial height and the minimum height of cut for the lawn mower. It was mentioned above that the latch slots 42 are angled with respect to a radial line extending from the pin 30 through the base of each slot. The weight of the lawn mower is carried by the wheels 16. This load is transmitted to the attachment 20 through the axle 34 which in turn applies a load to the lever 28 tending to rotate the lever 28 about the pivot pin 30. By having the latch slots 42 angled as shown, they are effective in preventing rotation of the lever 28 since the force delivered from the latch pin 44 to each slot 42 is against the side of the slot. There is, therefore, no tendency for the force applied through the axle 34 to disengage the latch pin 44 from the particular slot 42 in which it is latched.

In view of the detailed description included above, the operation of the adjustable wheel supporting attachment of the present invention will be readily understood by those skilled in the art. This very simple attachment involving only two relatively movable parts, the side plate 22 and the support member or lever 28, permits very easy adjustment of the wheel height. In spite of the ease of adjustment, the mechanism remains securely locked in any selected height position.

While there has been illustrated and described a single embodiment of the present invention, it will be understood that various changes and modifications of the invention will occur to those skilled in the art. It is aimed in the appended claims to cover all such changes and modifications as fall within the true spirit and scope of the present invention.

What is claimed as new and desired to be secured by Letters Patent of the United States is:

1. A wheel mounting attachment for a lawn mower comprising a supporting plate, a wheel mounting member having an axle and being pivotally connetced to said plate, means latching said member in a plurality of selected rotary positions for selected axle heights, said last-mentioned means including a series of slots and a cooperating latch pin on said supporting plate and said wheel mounting member movable into any one of said slots to position said member in one of said rotary positions, a pin on said plate extending through a slot on said member to permit limited sliding motion of said member with respect to said plate for disengaging said latch pin from said slots, and spring means urging said member to a latched position.

2. A wheel mounting attachment for a lawn mower comprising a supporting plate, a wheel mounting member having an axle and being pivotally connected to said plate, means latching said member in a plurality of selected rotary positions for selected angle heights, said last-mentioned means including a series of slots on said plate and a cooperating latch pin on said member movable into any one of said slots to position said member in one of said rotary positions, a pin on said plate extending through a vertical slot on said member to permit limited sliding motion of said member with respect to said plate for disengaging said latch pin from said slots, and spring means urging said pin on said plate upwardly with respect to said member, said slots being angled with respect to a line through said pin on said plate and said axle to prevent the load carried by said axle from disengaging said latch pin.

3. A wheel mounting attachment for a lawn mower comprising a side plate having means for attaching it to the side of a lawn mower, an L-shaped lever connected at its midpoint to said plate by means permitting sliding and pivotal movement between said plate and lever, a wheel mounting axle carried by one leg of said lever and latching means on the other leg, spring means urging said lever downwardly with respect to said plate, and a series of latch slots formed on the periphery of said plate for engagement by said latching means to restrain said lever from rotation with respect to said plate, slidable movement of said lever with respect to said plate in opposition to said spring means unlatching said latch means from said slots and permitting rotation of said lever to move said wheel axle vertically with respect to said mower housing.

4. In combination with a lawn mower having a housing supporting a rotary grass cutting means, an improved wheel mounting means comprising a side plate attached to said housing, a support lever pivotally connected to said side plate, said plate having a pin which is received in a slot formed in said lever, means mounting a wheel on said lever with the axis of said wheel spaced from the axis of said pin, spring means urging said lever downwardly with respect to said plate, a manual operating handle on said lever for raising said lever in opposition to said spring means, a series of latch slots on the upper edge of said plate, and a latch pin selectively receivable in one of said slots to position said wheel at various heights with respect to said housing.

5. In combination with a lawn mower having a housing supporting a rotary grass cutting means, an improved wheel mounting means comprising a side plate attached to said housing, a support lever pivotally connected to said side plate by a pin and a cooperating slot within which said pin is received, a wheel mounting axle on said lever having its axis spaced from said slot and on a line substantially perpendicular to said slot, spring means urging said lever downwardly with respect to said plate, a series of latch slots on the upper edge of said plate, and a latch pin extending from said lever and selectively receivable in one of said slots to position said axle at various heights with respect to said housing.

6. In combination with a lawn mower having a housing supporting a rotary grass cutting means, an improved wheel mounting means comprising a side plate attached to said housing, a support lever pivotally connected to said plate by a first pin having a shank and an enlarged head portion, said lever having a slot in which said shank is slidably received, spring means acting between said plate and said lever urging said pin upwardly in said slot, a wheel supporting axle mounted on said lever spaced from said slot on a line perpendicular thereto, a second pin on said lever for latching said lever in various rotary positions, and a series of slots in said plate positioned above and spaced equidistant from said first pin, said slots being angled with respect to a radial line from said first pin, said lever being slidable with respect to said plate in opposition to said spring to move said second pin from one slot to another and thereby move said axle between vertically spaced positions.

References Cited in the file of this patent

UNITED STATES PATENTS

| | | |
|---|---|---|
| 2,818,270 | Catalaine | Dec. 31, 1957 |
| 2,915,318 | Chesser | Dec. 1, 1959 |
| 2,966,365 | Kortum | Dec. 27, 1960 |